US012742353B1

(12) United States Patent
Salvoni

(10) Patent No.: US 12,742,353 B1
(45) Date of Patent: Sep. 22, 2026

(54) SYSTEM AND ASSEMBLY FOR THERMALLY BROKEN WINDOWS AND DOORS

(71) Applicant: Bruno Salvoni, Doral, FL (US)

(72) Inventor: Bruno Salvoni, Doral, FL (US)

( * ) Notice: Subject to any disclaimer, the term of this patent is extended or adjusted under 35 U.S.C. 154(b) by 385 days.

(21) Appl. No.: 18/207,039

(22) Filed: Jun. 7, 2023

Related U.S. Application Data

(60) Provisional application No. 63/400,319, filed on Aug. 23, 2022.

(51) Int. Cl.
*E06B 3/46* (2006.01)

(52) U.S. Cl.
CPC .................................. *E06B 3/4609* (2013.01)

(58) Field of Classification Search
CPC ............. E06B 3/4609; E06B 3/42; E06B 3/46
See application file for complete search history.

(56) References Cited

U.S. PATENT DOCUMENTS 3,896,589 A 7/1975 Mitchell
4,003,102 A 1/1977 Hawks
4,351,131 A 9/1982 Kubik
4,443,984 A 4/1984 Rasmussen
D327,527 S 6/1992 Walker, Jr. et al.
5,465,537 A 11/1995 Fullwood
5,560,149 A 10/1996 Lafevre
5,596,851 A 1/1997 Ting
5,622,017 A 4/1997 Lynn et al.
5,653,073 A 8/1997 Palmer
5,791,104 A 8/1998 Baier et al.
5,941,033 A 8/1999 Adams
6,055,782 A 5/2000 Morton et al.
6,158,182 A 12/2000 Biebuyck
6,182,405 B1 2/2001 Lindahl
D486,919 S 2/2004 Legay et al.
6,715,248 B2 4/2004 Biebuyck
6,786,021 B1 9/2004 Chen
6,807,778 B2 10/2004 Engebretson
D508,741 S 8/2005 Mitrevics
D513,806 S 1/2006 Mitrevics
6,993,873 B2 2/2006 Biebuyck et al.
7,665,941 B2 2/2010 Wolf et al.
(Continued)

*Primary Examiner* — Rodney Mintz
(74) *Attorney, Agent, or Firm* — MALLOY & MALLOY, PL

(57) ABSTRACT

At least one embodiment of the present invention is directed to a frame component to be used in connection with doors, windows, and other related aperture systems and configured to provide thermal break capabilities through a monolithic structure. Such a frame component may comprise first and second ending panels with a primary panel disposed therebetween. Residing through such primary panel may be one or a plurality of primary apertures, within which at least one insulating component may be disposed, wherein such an insulating component may be configured for the receipt of an insulation layer therein. Such a frame component may be formed of stainless steel or aluminum, or some other metallic material, and may be used in connection with numerous door and window applications while being selectively configured to provide a greater reduction in thermal transmission therethrough or, alternatively, greater structural rigidity via adjustment of a thermal area ratio.

20 Claims, 7 Drawing Sheets

(56) References Cited

U.S. PATENT DOCUMENTS

D612,517 S 3/2010 Nicholson
D612,951 S 3/2010 Piano
7,685,775 B2 * 3/2010 Speyer .................... E06B 7/23 49/306
7,707,779 B2 * 5/2010 Petta ........................ E06B 7/14 49/404
D621,073 S 8/2010 Bergmann
7,941,982 B2 5/2011 Merica
8,024,898 B2 9/2011 Alvarado
D665,516 S 8/2012 Bergmann
8,584,410 B2 11/2013 Furgerson et al.
8,640,339 B2 2/2014 Gilles et al.
9,062,490 B2 * 6/2015 Kadavy .................... E06B 1/36
9,187,946 B2 * 11/2015 Krause .................... E04B 1/665
9,303,410 B2 * 4/2016 Steffes ................ E04F 13/0733
D757,300 S 5/2016 Haberland et al.
9,476,250 B2 10/2016 Danaud et al.
D772,429 S 11/2016 Bergmann
9,797,140 B1 * 10/2017 Conklin .............. E04D 13/0315
9,834,941 B1 * 12/2017 Bilge ...................... E04F 13/12
D809,160 S 1/2018 Zuellig
9,874,018 B1 * 1/2018 Conklin .............. E06B 3/66304
D811,618 S 2/2018 Zuellig
10,119,325 B2 * 11/2018 Barton .................. E05D 15/582
10,196,850 B2 * 2/2019 Wexler ...................... E06B 3/28
10,900,273 B1 1/2021 Salvoni
11,066,832 B2 * 7/2021 Krause .................... E04B 1/388
11,326,391 B2 * 5/2022 Luvison ................ E06B 3/5821
11,365,582 B1 6/2022 Salvoni
2002/0129573 A1 * 9/2002 Biebuyck .................. E04B 2/96 52/235
2003/0226321 A1 * 12/2003 Engebretson ........... E06B 1/345 52/745.15
2004/0074174 A1 * 4/2004 Biebuyck .................. E04B 2/96 52/235
2004/0244924 A1 12/2004 Peppett
2006/0059780 A1 3/2006 Petta et al.
2006/0143996 A1 * 7/2006 Alvarado .................. E06B 1/62 52/204.53
2006/0185274 A1 * 8/2006 Merica ...................... E06B 7/28 52/235
2007/0151179 A1 7/2007 Speyer et al.
2007/0234657 A1 10/2007 Speyer et al.
2010/0263307 A1 * 10/2010 Gilles ....................... E06B 3/08 52/716.6
2010/0269432 A1 * 10/2010 Furgerson ................. E06B 1/26 52/745.15
2014/0041326 A1 2/2014 Kadavy et al.
2014/0053488 A1 2/2014 Lenox et al.
2014/0202083 A1 7/2014 Joray
2015/0152678 A1 * 6/2015 Krause .................... E04B 1/665 52/62
2015/0167313 A1 * 6/2015 Steffes ...................... E04C 2/20 52/506.01
2015/0233177 A1 8/2015 Marchand
2015/0247357 A1 * 9/2015 Danaud ..................... E06B 7/16 49/404
2016/0201383 A1 7/2016 Lenox et al.
2016/0333630 A1 11/2016 Barton et al.
2016/0348418 A1 12/2016 Wexler
2016/0348423 A1 12/2016 Cruysberghs
2018/0038144 A1 2/2018 Metzger
2020/0284043 A1 * 9/2020 Krause .................... E04B 1/388
2021/0246717 A1 * 8/2021 Luvison ................ E06B 3/5821

* cited by examiner

SYSTEM AND ASSEMBLY FOR THERMALLY BROKEN WINDOWS AND DOORS

CLAIM OF PRIORITY

The present Non-Provisional patent application hereby makes a claim of priority to an earlier filed and currently U.S. provisional patent application having Ser. No. 63/400,319 and a filing date of Aug. 23, 2022, the contents of which are hereby incorporated in its entirety.

BACKGROUND OF THE INVENTION

Field of the Invention

The present invention is directed to a frame component to be used in aperture systems such as door and window frames, wherein such a frame component comprises at least one primary aperture disposed through a primary panel for the provision of thermal break capabilities.

DESCRIPTION OF THE RELATED ART

In systems relating to windows, doors, and the like, energy efficiency is often an important design consideration. Indeed, for geographic areas having extreme weather conditions, whether comprising colder climates or hotter climates, a building's energy efficiency can be imperative, from both an economic standpoint as well as comfort standpoint. Such considerations are increasingly more important as the climates around the world continue to become more extreme.

The frame associated with windows and/or doors often makes a significant difference in a building's energy efficiency. This is so partly due to the difference in materials used for window and/or door frames versus the materials used for the rest of the building. Indeed, such frames are often comprised of a metal, such as aluminum. Compared to other building materials, such as concrete, wood, and/or bricks, metals such as aluminum have higher heat conductivity. As a result, heat transfer occurs much quicker in the window and/or door frames than in other parts of a building, thereby causing such structures to both gain and lose heat much faster than the other portions of the building. When disposed in connection with a piece of glass, such as a window, the aforementioned heat transfer issues are only exacerbated and can lead to other issues, such as mold growth or material degradation resulting from, for instance, the formation of condensation on the glass.

Traditional attempts to resolve such issues relating to heat transfer in door and window frames comprise the inclusion of a thermal break within the frame structure. Such a thermal break is intended to reduce the heat conductive properties of the entirety of the system, and often comprises a strip of material placed between two different profiles of the relevant structures. Such a material is often made of plastic, some other polymer, or some material which comprises a low thermal conductivity, such as plastic or some polymer, thus reducing the heat transfer between the structure and the surrounding atmosphere.

However, such a thermal break solution is not without its faults. Chief among those faults is the requisite mechanical arrangement of thermal break systems, which consist of three distinct profiles of the door and/or window frame system—i.e., an inner profile, an outer profile, and a break profile. As may be understood, such a mechanical arrangement requires the separate manufacturing of each such profile, followed by the subsequent assembly thereof. Naturally, such a manufacturing sequence increases manufacturing costs. And, notably, such an arrangement of three distinct but assembled profiles typically reduce the structural integrity of the system as a whole. Moreover, it may be understood the inclusion of the thermal break increases the weight of the door and/or window frame system, thus increasing the complexity of shipping, installing, and/or repairing the same.

As a result, there exists a need in the art for a door and/or window frame system that provides the benefits of a thermal break, while reducing or vitiating the negatives associated therewith. Such a solution should be configured to provide a reduction in the heat conductive properties of the door and/or window frame system while likewise reducing the number of distinct profiles required in such a system. Such a solution should further be configured for ease of manufacturing and installation. Such a solution should likewise be configured to reduce the weight associated with such door and/or window frame systems. Furthermore, any such solution should be configurable for a variety of applications, whether relating to the application thereof—i.e., able to be used in connection with a plurality of different types of door and window frames—as well as the degree of thermal break afforded thereby as well as the structural integrity thereof.

SUMMARY OF THE INVENTION

The present invention is directed to a thermal break system for use in connection with frames relating to doors, windows, and other like apertures separating the interior of a home, abode, building, dwelling, or structure from the exterior thereof, whether configured for the ingress and egress of persons therethrough or otherwise, and whether configured to be stationary, movable, or otherwise. As used herein, such a frame shall be referred to as an "aperture frame," which is meant to convey and include the foregoing definition. Accordingly, at least one embodiment of the present invention is directed to a thermal break system for use in connection with an aperture frame.

Specifically, the thermal break system of at least one embodiment of the present invention may comprise a frame component. Such a frame component may be configured to surround a door and/or window, and may thus comprise a border between a door and/or window and the structure upon which the same is mounted. Such a frame component may be rigid and may be formed of a metal, such as steel, stainless steel, aluminum, or some other similar material. In various embodiments of the present invention, such a frame component may be used in connection with a plurality of different applications, including a fixed window, a casement window, a French door, or any other similar such application relating to aperture frames.

In at least one embodiment, such a frame component may comprise a monolithic structure, insofar as such frame component is made of one solid structure. Such a frame component may, in at least one embodiment, be formed in a three-panel shape, with two pairs of such panels meeting along a vertex line. Alternatively put, such a frame component may comprise approximately a z-shape or a balbis shape. More specifically, such a frame component may comprise a primary panel situated between a first ending panel and a second ending panel, such that the primary panel terminates at such first and second ending panels. In at least one embodiment, the intersection between such primary panel and such first and second ending panels may comprise an intersection angle of approximately 90 degrees; however, alternative intersection angles are envisioned herein.

In at least one embodiment of the present invention, the arrangement of the primary panel and the first and second ending panels of the frame component may be formed through a plurality of different processes. For instance, in one embodiment, the shape of the frame component may be formed through press forming or brake forming processes or other similar bending processes utilizing a die about which the frame component is deformed. Alternatively, such a frame component may be formed through roll forming processes or any other processes configured to provide the desired shape between the primary panel and the first and secondary panels as a unitary and/or monolithic structure without reducing the structural integrity thereof.

In various embodiments, such a frame component may be formed of a metallic material. For instance, such a frame component may be formed of stainless steel or aluminum, or some other metallic material suitable for use in aperture frames. In at least one embodiment, such a frame component may be within a range of 3 millimeters to 6 millimeters in thickness. As may be understood, such variations in thickness may be selectively applied dependent on the intended use of the frame component. For instance, a frame component having a frame thickness of 3 millimeters may be used in connection with a frame component configured to be anchored against a wall or some other structure, whereas a frame component having a frame thickness of 6 millimeters may be used in connection with a self-sustained structure. However, it may be understood alternative frame thicknesses are envisioned herein.

In at least one embodiment of the present invention, the primary panel of such a frame component may have one or a plurality of primary apertures formed thereon. Such primary aperture(s) may be configured to fully extend through the primary panel of the frame component, thus creating fluid communication between opposite sides of the frame component. The number of primary apertures formed on the primary panel may vary depending on the length of the frame component. For example, in one embodiment, such a primary panel may have two primary apertures formed thereon. Alternatively, in at least one embodiment, such a primary panel May have five primary apertures formed thereon. Accordingly, it may be understood the primary panel of at least one embodiment of the frame component may comprise one or more primary apertures disposed therethrough.

Disposed between such primary aperture(s) and/or the edges of the primary panel may be a bridge structure, which may comprise a strip of material connecting opposite ends of the primary panel. As may be understood, in embodiments wherein the primary panel comprises a plurality of primary apertures, there may be a plurality of bridge structures separating the same. Such a bridge structure may be utilized to ensure the structural integrity of the primary panel, and thus the frame component as a whole.

In at least one embodiment of the present invention, the area of the bridge structure(s) May comprise a small percentage of the total area of the primary panel. For instance, in at least one embodiment, such bridge area of the bridge structures may comprise a range of approximately 5% to 10% of the primary area of the primary panel. As may be understood, the primary area of the primary panel comprises the total area covered by the primary panel, whereas the bridge area comprises the collective area covered by the bridge structure(s). In so doing, it may be understood the amount of thermal transmission impacted by the primary panel may be effectively reduced in accordance with the ratio between the bridge area and the primary area, hereinafter referred to as the thermal area ratio. As may be understood, the thermal area ratio may be changed in various embodiments to reflect the desired application of the frame component of the present invention. For instance, for use in connection with an aperture frame intended to maximally reduce thermal transmission therethrough, the thermal area ratio of the frame component may be lower. In contrast, for use in connection with an aperture frame intended to maximize structural integrity, the thermal area ratio of the frame component may be higher.

In at least one embodiment, such primary aperture(s) may be formed via laser cutting processes, which may serve to form the primary apertures without bending, deforming, or otherwise damaging the frame component. However, it may be understood the use of alternative manufacturing processes, such as cutting and routing procedures are envisioned herein. As such, it may be understood the manufacturing of the primary aperture(s) may be non-limiting.

In various embodiments of the present invention, the primary aperture(s) of the primary panel may be disposed in connection with at least one insulating component. Such an insulating component may comprise, for instance, a plastic molded cover or some other similar structure which may be placed on, within, or over the primary aperture(s). In so doing, it may be understood the thermal transmission within such primary aperture(s) may be further altered to a desired degree.

For instance, such an insulating component may be formed of a variety of materials dependent on the intended amount of thermal transmission provided thereby. In one embodiment, such an insulating component may be formed of high-density polyethylene; however, alternative materials, whether plastic or otherwise, are envisioned herein.

In at least one embodiment of the present invention, such an insulating component May comprise at least one insulation cavity. For instance, such an insulating component may comprise a hollow interior such that there are at least two internal walls enclosing a space therein. In at least one embodiment, such an insulation cavity may be configured for the receipt of an insulation layer therein. Such an insulation layer may comprise, for instance, a plurality of rubber gaskets, a unitary piece of rubber or plastic, or some other structure and/or amalgamation of components configured to provide a reduction in the thermal transmission of the frame component.

These and other objects, features, and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to a thermal break system to be used in connection with aperture frames—e.g., frames used in connection with doors, windows, and other like apertures configured to separate the interior and exterior of a home, building, dwelling, or structure, whether configured for ingress and egress of persons therethrough or otherwise, and whether stationary, movable, or otherwise. More specifically, the thermal break system of at least one embodiment of the present invention is directed to a frame component to be used in connection with at least one of a plurality of aperture frames, whilst being configured to provide certain thermal break benefits including, without limitation, a reduction in the degree of thermal transmission experienced by the same.

Figure 1B:
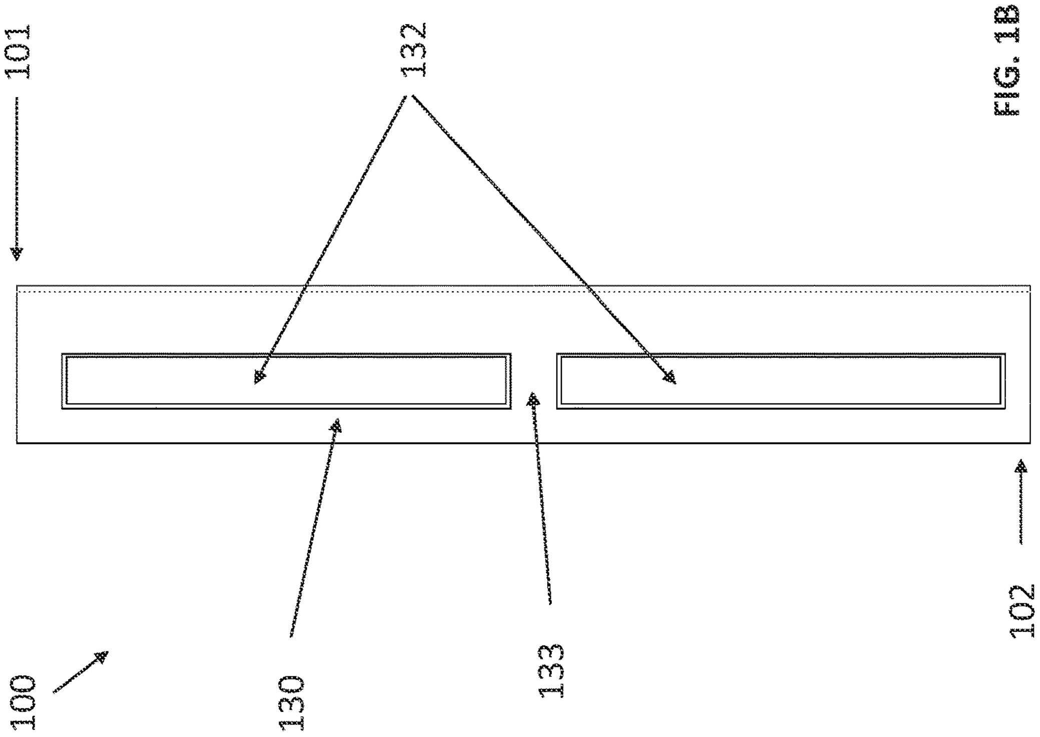
FIG. 1B depicts a front view of the thermal break system depicted in FIG. 1A.
Figure 1A:
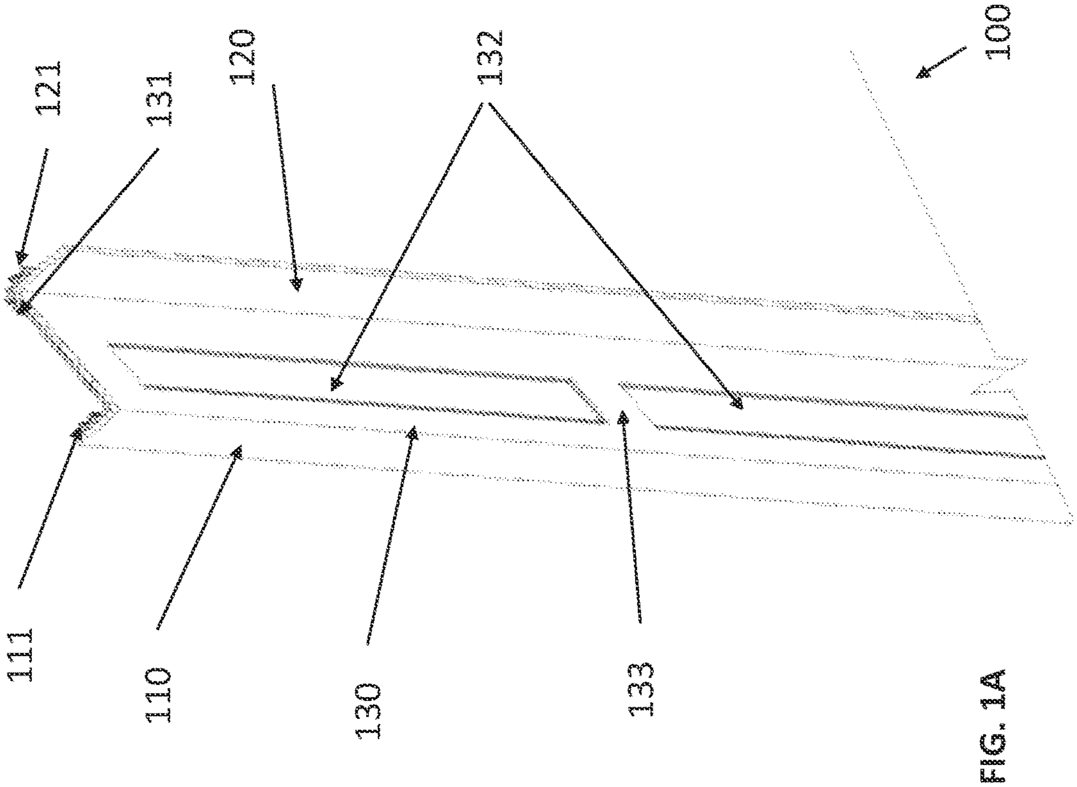
FIG. 1A depicts an isometric view of a thermal break system used in connection with aperture frames, in accordance with at least one embodiment of the present invention.

For instance, depicted in FIGS. 1A and 1B is a frame component 100 of at least one embodiment of the present invention. Such a frame component 100 may be configured for use in connection with a plurality of different aperture frames, such as frames for a fixed window, a casement window, a French door, or any other similar such application. Accordingly, it may be understood such a frame component 100 may be configured in connection with a door and/or window. In at least one embodiment, such a frame component 100 may be both rigid and unitary and/or monolithic, and may be comprised of, for instance, some metallic substance, such as steel, stainless steel, or aluminum. However, it may be understood alternative material compositions are contemplated herein.

More specifically, as depicted in FIGS. 1A and 1B, such a frame component 100 may be monolithic, such that the same is formed of one solid structure such that it extends in elongated fashion from a top end 101 to a bottom end 102, as well as between its transverse ends. Notwithstanding, such a frame component 100 may, in at least one embodiment, be formed in a three-panel shape. As an example, the embodiment depicted in FIGS. 1A and 1B comprises a first ending panel 110 and a second ending panel 120 having a primary panel 130 disposed therebetween. In other words, such a primary panel 130 terminates at the first ending panel 110 at one end, and the second ending panel 120 at the opposite end.

Figure 2:
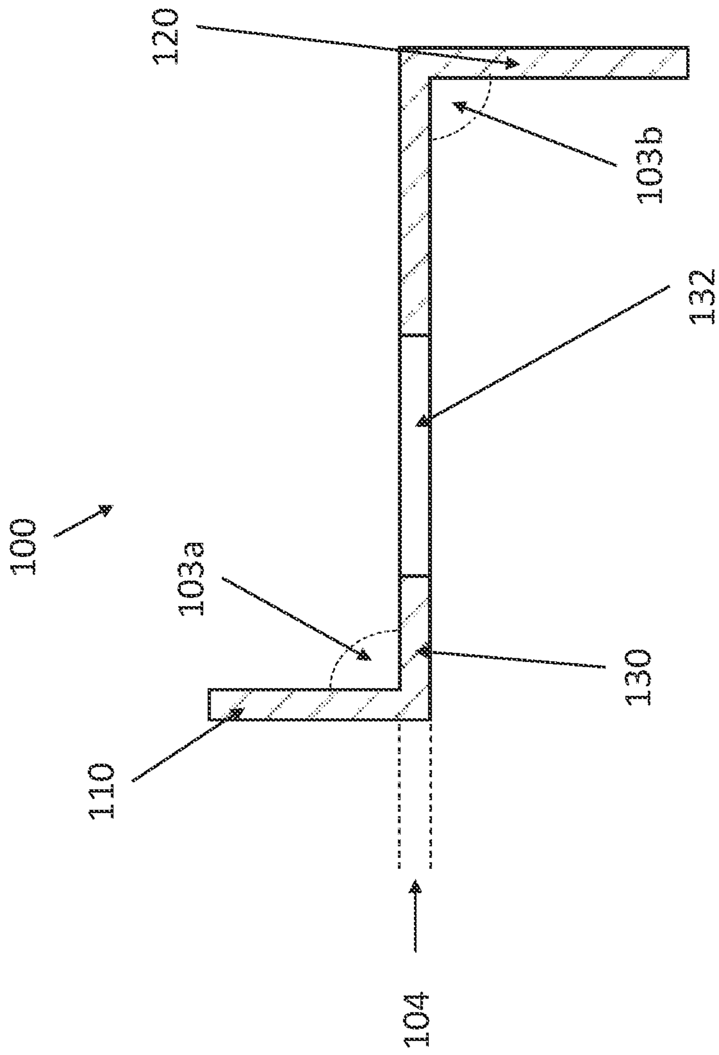
FIG. 2 depicts a top, cross-sectional view of a thermal break system used in connection with aperture frames, in accordance with at least one embodiment of the present invention.

In at least one embodiment, such first ending panel 110, second ending panel 120, and primary panel 130 may form a z-shape and/or a balbis shape, such as in the embodiment depicted in FIG. 2. In other words, the disparate panels of such a frame component 100 may each meet with an adjacent panel along a vertex line having an intersection angle 103*a*, 103*b* approximately equal to 90 degrees. However, alternative shapes of the frame component 100, whether comprising more or less panels, or alternative intersection angles, are contemplated herein. For instance, the present invention contemplates at least one embodiment of such a frame component 100 wherein such first intersection angle 103*a* and such second intersection angle 103*b* are not substantially equivalent.

To effectuate such a shape, such a frame component 100 may be subjected to certain manufacturing processes, such as press forming, brake forming, or other similar bending processes utilizing a die about which the frame component 100 is deformed. Alternatively, such a frame component 100 may instead be subjected to roll forming processes or other similar processes configured to provide the desired shape in a monolithic structure. In at least one embodiment, such as the one depicted in FIG. 2, such a frame component 100 may comprise a frame thickness 104 within a range of 3 millimeters to 6 millimeters; however, alternative thicknesses are envisioned herein, and may be selectively applied to provide greater rigidity dependent upon the intended use thereof. For instance, a frame thickness 104 of 3 millimeters, or less, may be used in connection with a frame component 100 intended to be anchored or otherwise affixed to a wall or some other structure. Conversely, a frame thickness 104 of 6 millimeters, or more, may be used in connection with a frame component 100 intended for use as a self-sustained structure. It may be understood the term "approximately," as used herein, such as in connection with the dimensions of the frame thickness 104, denotes the standard manufacturing tolerances associated with the manufacturing of the frame component 100, as known by those having skill in the art.

Figure 6:
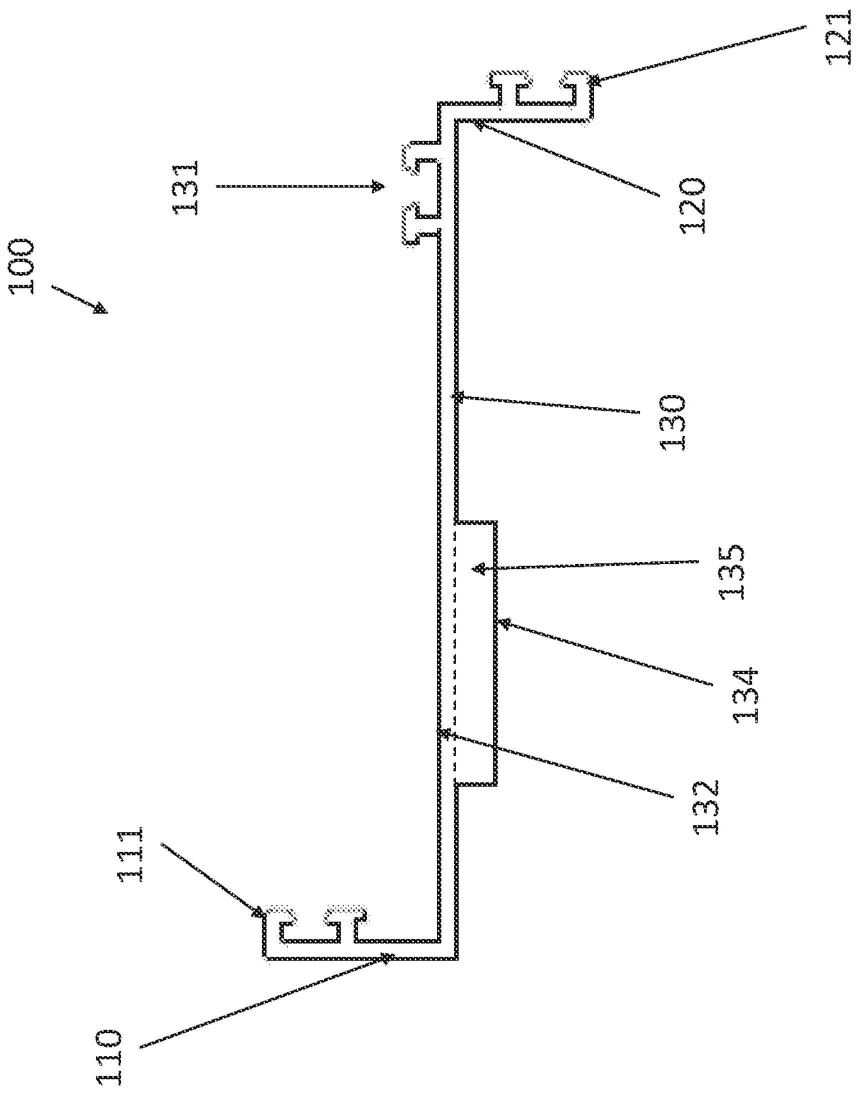
FIG. 6 depicts a top view of a thermal break system used in connection with aperture frames, in accordance with at least one embodiment of the present invention.

Returning to FIG. 1A, it may be seen each of the first ending panel 110, second ending panel 120, and primary panel 130 may comprise at least one attachment component disposed and/or formed thereon. For instance, such a first ending panel 110 may comprise a first attachment component 111, such a second ending panel 112 may comprise a second attachment component 121, and such primary panel 130 may comprise a primary attachment component 131. Such first attachment component 111, second attachment component 121, and primary attachment component 131 may each be formed on the top end 101 of the frame component 100, and/or May be formed on the bottom end 102 thereof. Each such first attachment component 111, second attachment component 121, and primary attachment component 131 may be configured for engagement with a cooperative attachment component of an adjacently disposed structure of an aperture frame. Accordingly, each such first attachment component 111, second attachment component 121, and primary attachment component 131 may comprise a clip structure, such as depicted in FIG. 6, or some other similar structure configured to engage with the cooperative attachment component of adjacent structures. In at least one embodiment, such first attachment component 111, second attachment component 121, and primary attachment component 131 may be integrally formed with the frame component 100; however, it is envisioned herein that the same may instead be affixed thereon.

Figure 3B:
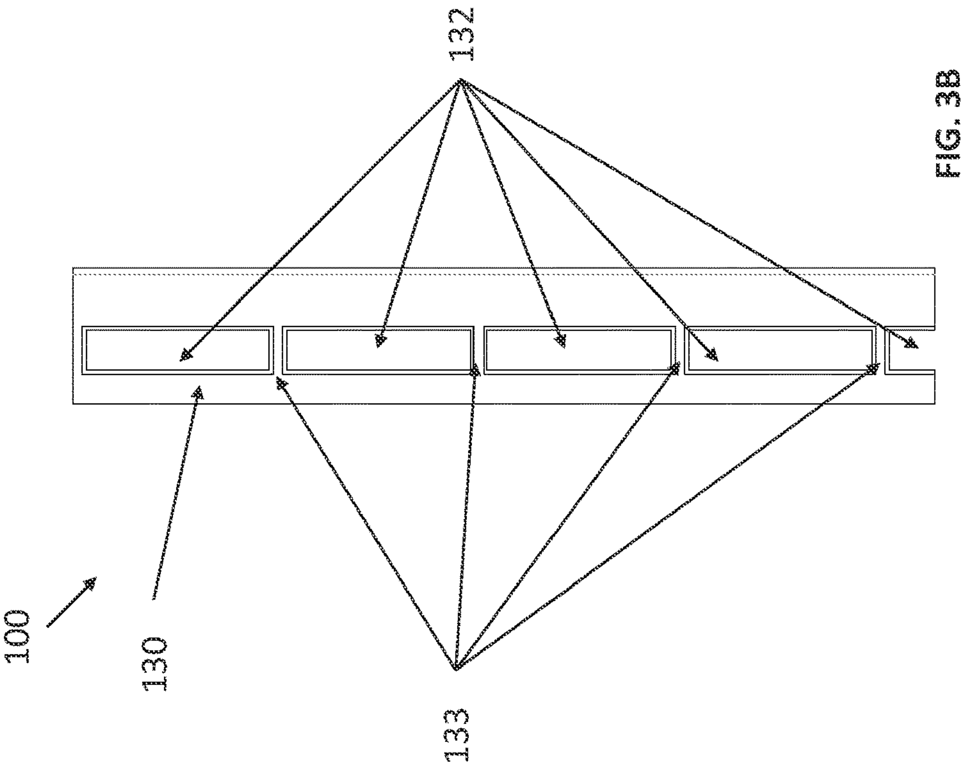
FIG. 3B depicts a front view of the thermal break system depicted in FIG. 3A.
Figure 3A:
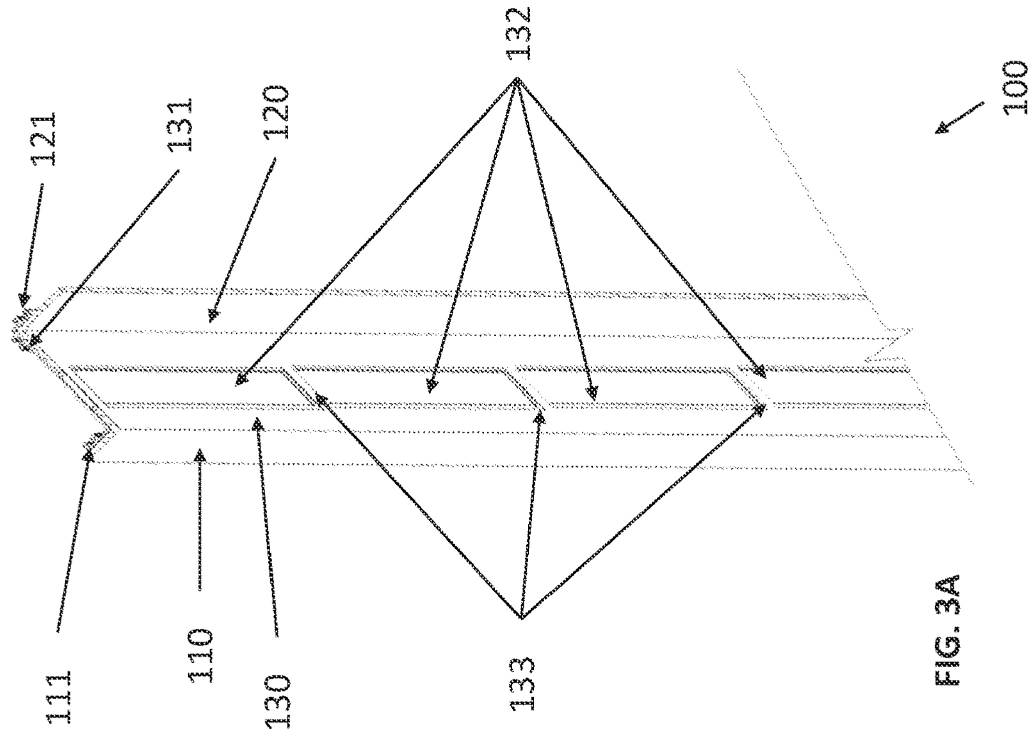
FIG. 3A depicts an isometric view of a thermal break system used in connection with aperture frames, in accordance with at least one embodiment of the present invention.

With continued reference to FIGS. 1A and 1B, it may be seen the primary panel 130 of the frame component 100 may have at least one primary aperture 132 formed therethrough. For instance, the embodiment depicted in FIGS. 1A and 1B comprise a primary panel 130 having two primary apertures 132 formed therethrough. However, alternative numbers of primary apertures 132 are envisioned herein. For instance, as depicted in the embodiment of FIGS. 3A and 3B, such a primary panel 130 may instead have five primary apertures 132 formed therethrough. As may be understood, it is contemplated herein that there may be one, two, three, four, five, or more primary apertures 132 formed through the primary panel. Such primary aperture(s) 132 may be configured so as to place the environment on opposite sides of the frame component 100 in fluid communication, such that air may pass therethrough.

In at least one embodiment, such primary aperture(s) 132 may be formed via laser cutting processes, which may thus form the same without bending, deforming, or otherwise damaging the frame component 100. However, alternative manufacturing processes, such as cutting and routing procedures, are envisioned herein.

Disposed between two primary apertures 132 on the primary panel 130, as well as between a primary aperture 132 and the top end 101 and bottom end 102 of the primary panel 130, may be a bridge structure 133. Such a bridge structure 133 may comprise a thin strip of material connecting opposite sides of the primary panel 130, thus improving the structural integrity of the primary panel 130, as well as the frame component 100 as a whole. Such a bridge structure 133 may be defined as only comprising that portion of material between a primary aperture 132 and an adjacent primary aperture 132 and/or top end 101 or bottom end 102 of the primary panel 130. Accordingly, such a bridge structure 133 may be substantially coincident with the edges of the primary aperture 132.

Figure 4:
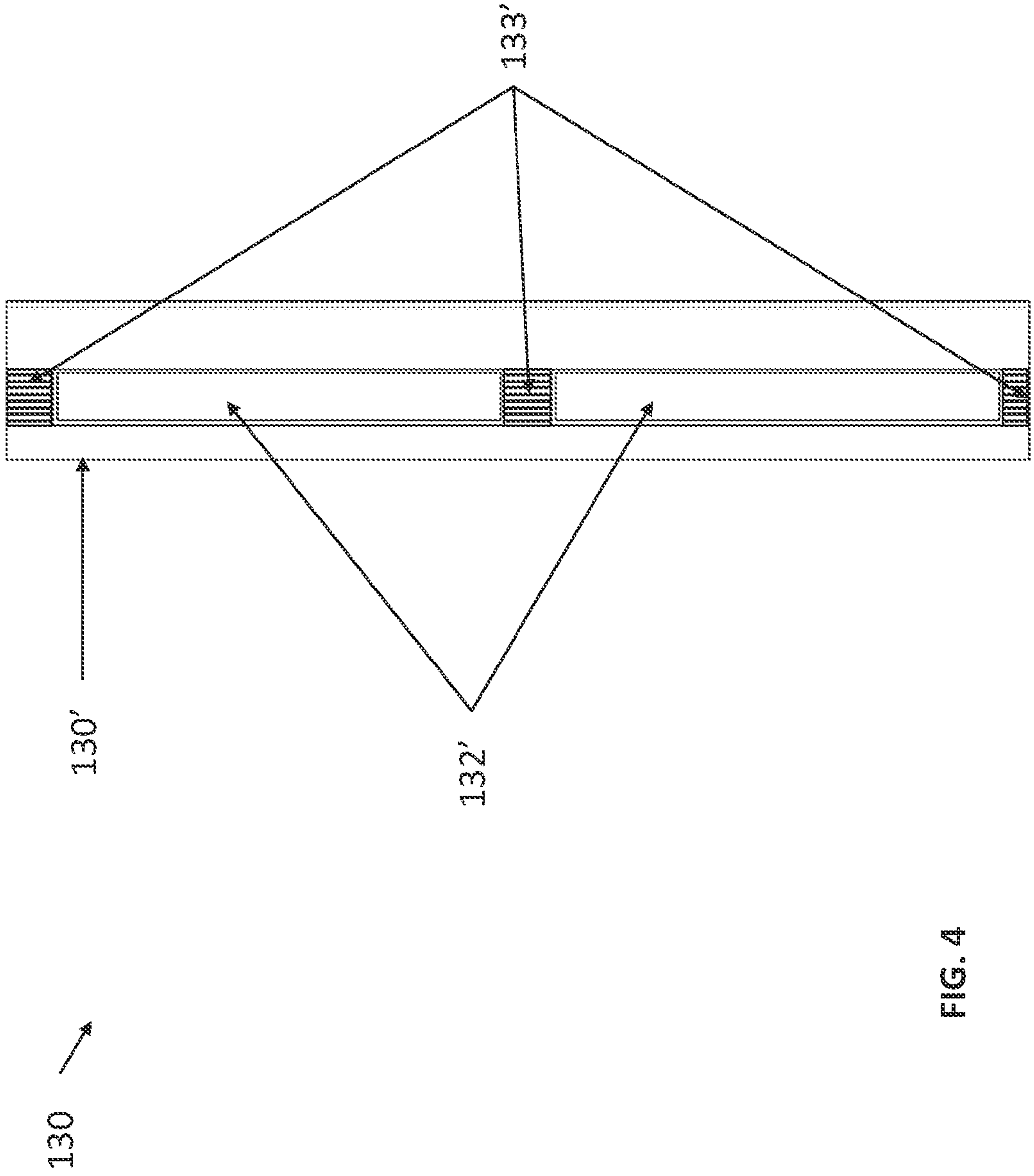
FIG. 4 depicts a front view of a thermal break system in accordance with at least one embodiment of the present invention.

In at least one embodiment of the present invention, the total area of the bridge structure(s) may comprise a small percentage of the total area of the primary panel 130. In other words, as depicted in FIG. 4, the bridge area 133', as collectively defined by the summation of the area of each bridge structure 133 on the primary panel 130, may be defined in relation to the primary area 130' of the primary panel 130. In at least one embodiment, such a bridge area 133' may comprise a range of approximately 5% to 10% of the primary area 130' of the primary panel 130; however, alternative ratios are envisioned herein. In so doing, the thermal transmission impacted by the primary panel may be effectively reduced in accordance with this thermal area ratio—i.e., the ratio between the bridge area 133' and the primary area 130'. Accordingly, it may be understood the degree of thermal transmission through the frame component 100 may be adjusted by changing the thermal area ratio of the primary panel 130. For instance, use of a lower thermal area ratio, such as at 5% or lower, may be used to maximally reduce thermal transmission through the frame component 100. In contrast, use of a higher thermal area ratio, such as at 10% or higher, may be used to maximize the structural integrity of the frame component 100 while still providing thermal break qualities.

In at least one embodiment, such a bridge structure 133 may be reinforced with certain structures and/or materials to provide further structural rigidity to the primary panel 130, and thus the frame component 100 as a whole. For instance, in at least one embodiment, such a bridge structure 133 may have at least one reinforcing component formed and/or applied thereon. For instance, such a reinforcing component may comprise a strip of material applied across the bridge structure 133, or a hook affixed across the bridge structure 133 and within the primary apertures 132 oppositely disposed therefrom. It should be understood alternative reinforcing structures are envisioned herein. In so doing, it may be understood the thermal area ratio discussed heretofore may be further reduced to maximally reduce thermal transmission through the primary panel 130 while maintaining sufficient structural rigidity of the frame component 100.

Figure 5B:
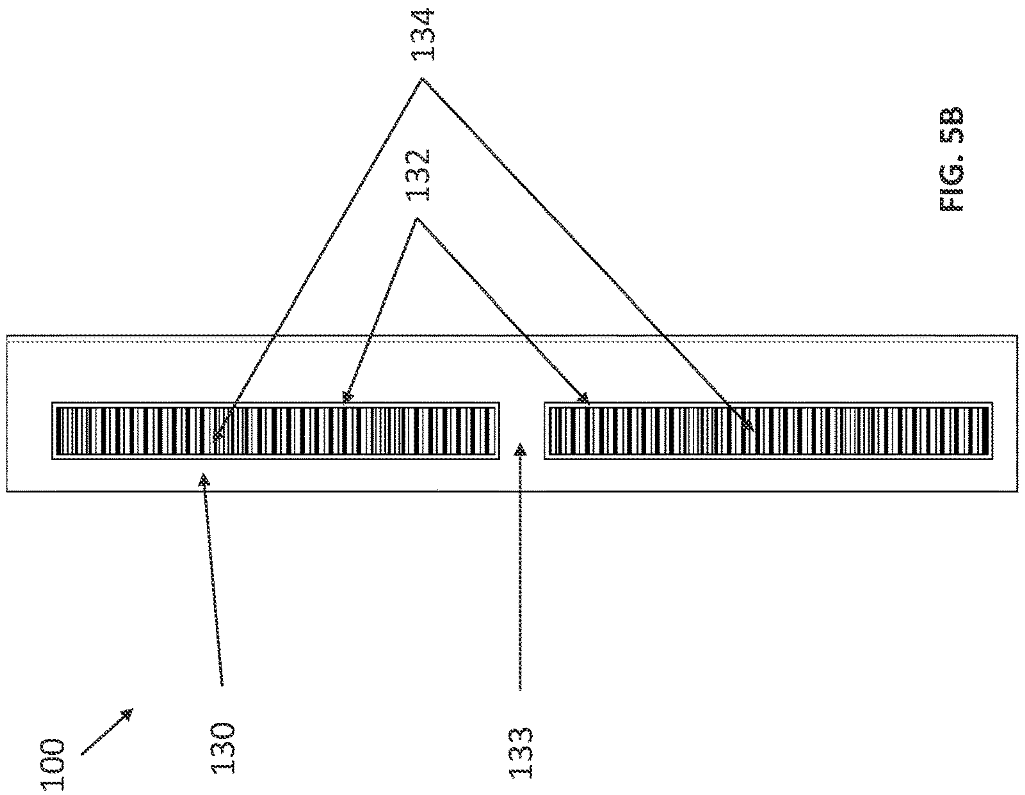
FIG. 5B depicts a front view of the thermal break system depicted in FIG. 5A.
Figure 5A:
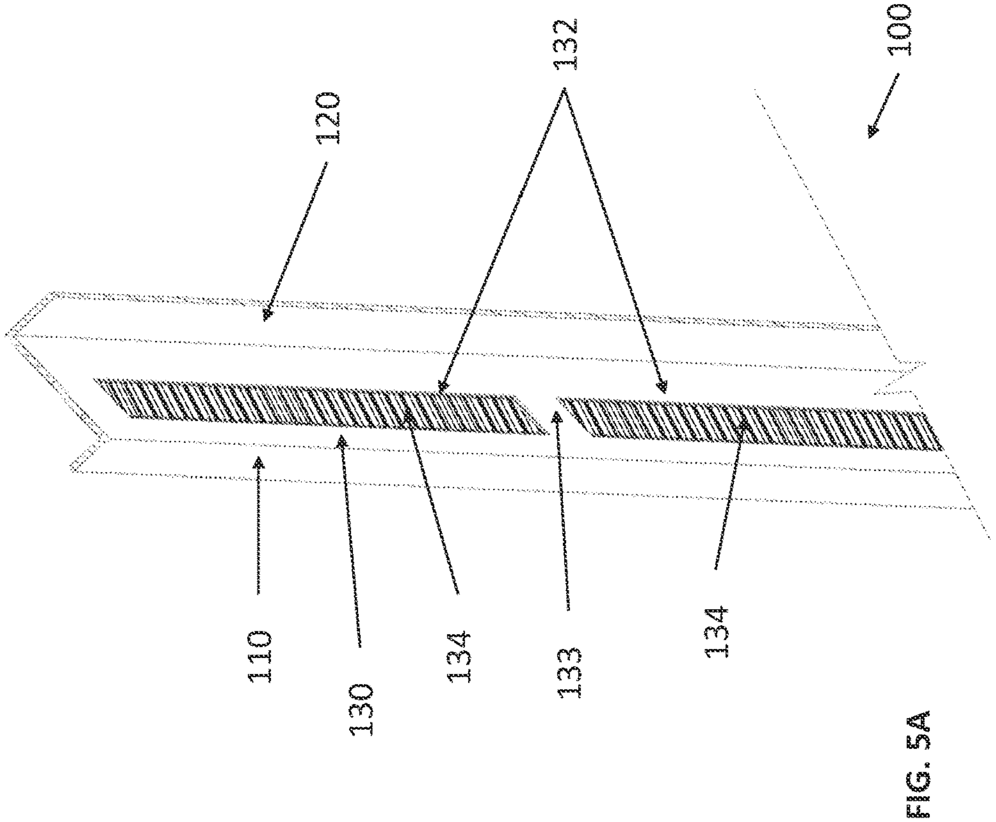
FIG. 5A depicts an isometric view of a thermal break system incorporating an insulating component, in accordance with at least one embodiment of the present invention.

In at least one embodiment of the present invention, the primary aperture(s) 132 of the primary panel 130 may be disposed in connection with at least one insulating component 134. For instance, as shown in the embodiment depicted in FIGS. 5A and 5B, such primary aperture(s) 132 may be configured to receive at least one insulating component 134, which may itself comprise, for instance, a plastic molded cover or some other similar structure. In at least one embodiment, such an insulating component 134 may be configured to reside within the metes and bounds of the receiving primary aperture 132. However, it is envisioned such insulating component(s) 134 may instead be configured to be placed on or over such primary aperture(s) 132 such that the same is in covering relation thereto.

By placing such primary aperture(s) 132 in connection with at least one insulating component 134, it may be understood the degree of thermal transmission through the primary panel 130 may be further reduced. For instance, such an insulating component 134 may itself be comprised of certain materials intended to reduce the degree of thermal transmission through the primary panel 130. For instance, such a primary panel 130 may be formed of high-density polyethylene; however, alternative materials, whether composed of plastic or otherwise, are envisioned herein.

In at least one embodiment, such as the one depicted in FIG. 6, such an insulating component 134 may comprise at least one insulation cavity 135. Such an insulation cavity 135 may comprise a hollow interior within the insulation component 134, such that there are at least two internal walls enclosing such a space therein. In so doing, at least a certain amount of air May be trapped within the insulation component 134, thereby reducing the degree of thermal transfer therethrough. Additionally, such an insulation cavity 135 may, in at least one embodiment, be configured for the receipt of an insulation layer. Such an insulation layer may comprise, for instance, a plurality of rubber gaskets, a unitary piece of rubber or plastic, or some other structure and/or amalgamation of components configured to provide a reduction in the thermal transmission of the frame component 130.

Figure 7:
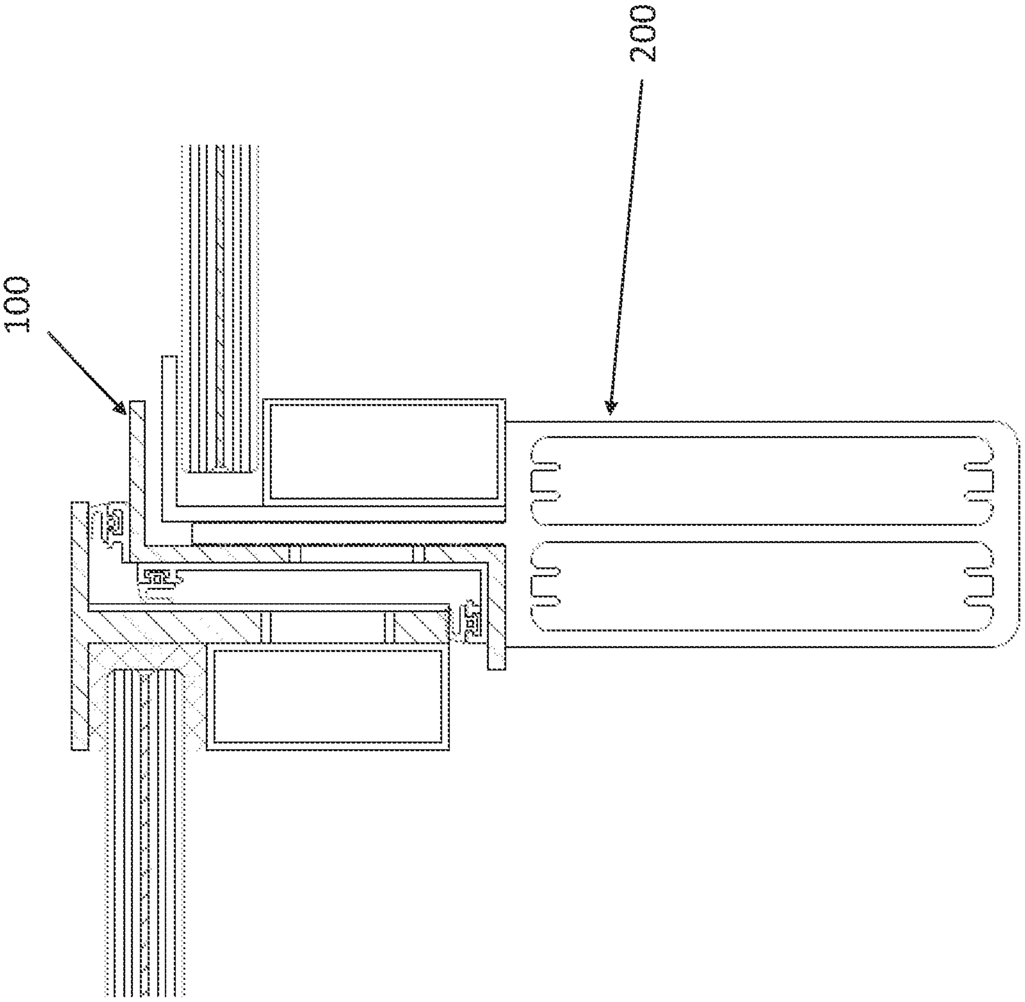
FIG. 7 depicts a top view of a thermal break system disposed in connection with an aperture frame, in accordance with at least one embodiment of the present invention.

As previously mentioned, the frame component 100 of the present invention may be used in connection with a plurality of different aperture frames. For instance, as depicted in FIG. 7, at least one embodiment of such a frame component 100 may be used in connection with an aperture frame assembly 200, such that such frame component 100 is configured to be affixed to the aperture frame assembly 200.

Since many modifications, variations, and changes in detail may be made to the described preferred embodiment of the present invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A thermal break system for use in connection with an aperture frame consisting of:

a frame component having a top end and a bottom end and defined by a thickness;

said frame component having a first ending panel extending in a first direction and a second ending panel extending in an opposite, second direction with a primary panel disposed and connected therebetween; and said primary panel having at least one primary aperture disposed therethrough, wherein said frame component is a unitary structure of one-piece construction composed of a single piece of material.

2. The system of claim 1, wherein said thickness is between approximately 3 millimeters to 6 millimeters.

3. The system of claim 1, wherein said material being selected from the group consisting of: stainless steel, steel, and aluminum.

4. A thermal break system for use in connection with an aperture frame consisting of:

a frame component having a top end and a bottom end and defined by a thickness;

said frame component having a first ending panel extending in a first direction and a second ending panel extending in an opposite, second direction with a primary panel disposed and connected therebetween; and said primary panel having at least one primary aperture disposed therethrough, said primary panel defining a primary area, wherein said primary panel having at least one bridge structure adjacently disposed with said at least one primary aperture, said at least one bridge structure defining a bridge area, wherein said frame component is a unitary structure of one-piece construction composed of a single piece of material.

5. The system of claim 4, wherein said bridge area having a thermal area ratio between approximately 5% to 10% in relation to said primary area of said primary panel.

6. A thermal break system for use in connection with an aperture frame consisting of:

a frame component having a top end and a bottom end and defined by a thickness;

said frame component having a first ending panel extending in a first direction and a second ending panel extending in an opposite, second direction with a primary panel disposed and connected therebetween; and said primary panel having at least one primary aperture disposed therethrough, wherein said at least one primary aperture is disposed in connection with at least one insulating component, wherein said frame component is a unitary structure of one-piece construction composed of a single piece of material.

7. A thermal break system for use in connection with an aperture frame comprising:

a frame component having a top end and a bottom end and defined by a thickness;

said frame component having a first ending panel extending in a first direction and a second ending panel extending in an opposite, second direction with a primary panel disposed and connected therebetween; and said primary panel having at least one primary aperture disposed therethrough, wherein said at least one primary aperture is disposed in connection with at least one insulating component, wherein said at least one insulating component comprises at least one insulation cavity.

8. The system of claim 7, wherein said at least one insulation cavity is configured to receive at least one insulation layer.

9. The system of claim 7, wherein said frame component comprises a monolithic structure.

10. A thermal break system for use in connection with an aperture system comprising:

a frame component comprising a top end and a bottom end and defined by a thickness;

said frame component comprising a first ending panel extending in a first direction and a second ending panel extending in an opposite, second direction with a primary panel disposed and connected therebetween;

said primary panel comprising at least one primary aperture disposed therethrough and at least one bridge structure disposed adjacent to said at least one primary aperture, said at least one primary aperture is disposed in connection with at least one insulating component;

said at least one bridge structure collectively comprising a bridge area;

said primary panel comprising a primary area; and said bridge area in relation to said primary area comprising a thermal area ratio between a range of approximately 5% to 10%.

11. The system of claim 10, wherein said thickness is between approximately 3 millimeters to 6 millimeters.

12. The system of claim 10, wherein said frame component comprises a monolithic structure.

13. The system of claim 10, wherein said frame component is formed from a material selected from the group consisting of: stainless steel, steel, and aluminum.

14. The system of claim 10, wherein said first ending panel and said primary panel form a first intersection angle and said second ending panel and said primary panel form a second intersection angle.

15. The system of claim 14, wherein both said first intersection angle and said second intersection angle are approximately 90 degrees.

16. A thermal break system for use in connection with an aperture system comprising:

a frame component comprising a top end and a bottom end and defined by a thickness;

said frame component comprising a first ending panel extending in a first direction and a second ending panel extending in an opposite, second direction with a primary panel disposed and connected therebetween;

said primary panel comprising at least one primary aperture disposed therethrough and at least one bridge structure disposed adjacent to said at least one primary aperture; and said at least one primary aperture is disposed in connection with at least one insulating component having an insulation cavity formed therein, said insulation cavity configured to receive at least one insulation layer, wherein said frame component is a unitary structure of one-piece construction composed of a single piece of material.

17. The system of claim 16, wherein said at least one insulation layer comprises a plurality of rubber gaskets.

18. The system of claim 16, wherein said primary panel further comprises at least one bridge structure adjacently disposed to said at least one primary aperture.

19. The system of claim 16, wherein said at least one bridge structure comprises a bridge area and said primary panel comprises a primary area.

20. The system of claim 19, wherein said bridge area having a thermal area ratio between approximately 5% to 10% in relation to said primary area of said primary panel.

* * * * *